INVENTORS.
JOHN S. JAQUITH.
EDWARD P. TOMASZEK.
LELAND R. SMITH.
BY
ATTORNEYS.

INVENTORS.
JOHN S. JAQUITH.
EDWARD P. TOMASZEK.
LELAND R. SMITH.
BY
ATTORNEYS.

United States Patent Office 2,962,909
Patented Dec. 6, 1960

2,962,909

ROLL POSITIONING SYSTEM FOR TOROIDAL VARIABLE RATIO TRANSMISSIONS

John S. Jaquith, Milford, Edward P. Tomaszek, Shelton, and Leland R. Smith, Seymour, Conn., assignors to Avco Manufacturing Corporation, Lycoming Division, Stratford, Conn., a corporation of Delaware Filed Jan. 29, 1959, Ser. No. 789,929

6 Claims. (Cl. 74—200)

This invention relates to a roll positioning system for effecting change in drive ratio between the input and output of opposed toroid friction disks of a toroidal type variable ratio transmission.

The speed ratio change mechanism of the kind to which this improvement is applied employs the combination of opposed disks with toroidal grooves, such toroid friction disks having interposed therebetween friction wheels or rollers which are adapted to ride in the said grooves and thus transmit power from one toroid to the other.

The referred to toroidal grooves are annular grooves of circular cross-section, formed in the opposite faces of the disks, the interposed friction wheels or rollers being adjustable in two different planes of movement to vary the speed ratio between disks. A plurality of these friction rollers are employed and these are mounted not only for rotation about their axes for effecting drive, but as just suggested, are mounted for tilting movement both in a plane always coincident with the axis of rotation of the disks, and also are supported for movement angularly to this axis for steering the rolls. The latter movement results in the tilting effect which changes the drive ratio between the input and output toroidal friction disks.

The instant invention supplies this novel concept: that tilting movement of the rollers in a direction to change the drive ratio can be accomplished by angularly deviating or "steering" the rollers about an axis which is perpendicular or normal to the rotation of the roller and extending through the points of contact of the roller with the surfaces of the toroids. The novel means of accomplishing this initial movement, as well as the functional result of the ultimate tilting to effectuate gear ratio change, constitute the fundamental principles of this invention.

It is thus a primary object of this invention to provide a means for altering the drive ratio in a transmission of the described type by employing a roller which may be tilted angularly to the planar surfaces of the toroids and by providing means to accomplish steering of the roller by movement of the axis thereof in a plane parallel to the plane of movement of the toroids. This tilting action, being responsive to an initial steering movement, is thus accomplished in a most simplified yet efficient manner.

It is a further object of the invention to provide a resilient cantilever support mechanism for the drive rollers, so arranged that the resilient movement caused by deflection of the rollers will tend to equalize the drive between the plurality of drive rollers employed.

Another object of the invention is the provision of a cam-slot interconnection between the roller control and the roller itself which enables prompt and efficient control by tilting through steering action of the roller, thus accomplishing accurate tracking of the roller along that portion of the respective inner peripheries of the toroids as to obtain the predetermined and desired speed ratio.

The above and other objects of the invention will appear more fully from the following more detailed description, made with reference to the accompanying drawings, and wherein:

Figure 3 is an enlarged cross-section through one of the rollers and its supporting structure;

Figure 1:
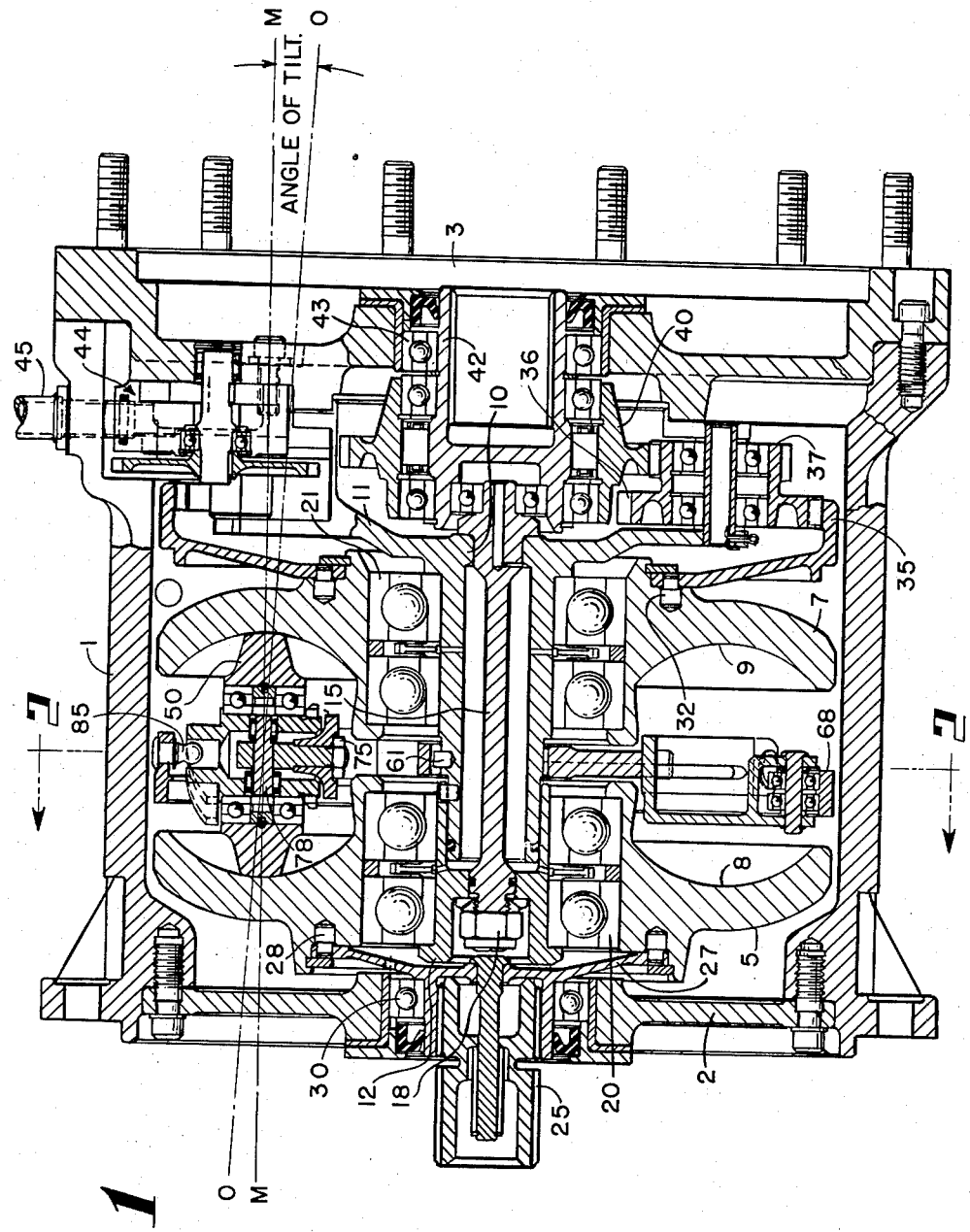
Figure 1 is a cross-section through the assembled transmission of the type herein considered.

Referring now more specifically to these several drawings, it is seen that the entire transmission is positioned within a tubular casing 1 having the customary circular side walls 2 and 3. The driving and driven toroids are 5 and 7, respectively. The grooves 8 and 9 in these toroids are semi-circular in cross-section, and, due to the opposed relationship of each toroid, are accordingly opposite to each other. Thus, together they form a circular toroidal cross-section.

In this embodiment of the invention, the toroid disk 5 is the input disk and the toroid disk 7 is the output toroid. Both toroids 5 and 7 are mounted upon a common stationary shaft 10, the latter being secured to the casing itself in any usual manner, as through a spider or ring arrangement 11. At its center the input toroid 5 is fitted with a boss 12 and pressure can be asserted against this fitting by means of the bolt 15. When the nut 18, which is threaded upon this bolt, is taken up, it will be understood that a consequent pressure results forcing the two toroids 5 and 7 together. This will be further understood by considering that the output toroid 7 bears against the referred to element 11 and that the head of the bolt 15 also bears against element 11. Hence, each of the toroids can be compressed toward each other by the take-up mechanism just referred to.

Both toroids are mounted upon anti-friction bearings, toroid 5 upon ball bearings 20 and toroid 7 upon bearings 21. It will be noted from inspection of Figure 1 that these bearing races also take the form of thrust bearings, thus, permitting substantial take-up or compression of the two toroid members toward each other without undue frictional binding effect.

The input shaft to the unit is indicated at 25. It is keyed in any suitable manner to a spider or circular element 27, which in turn, by bolts 28, is affixed to the input toroid 5. The input shaft 25 is journaled in suitable anti-friction bearings 30.

The output toroid 7 is, by means of bolts 32, secured to an element similar to element 27, here indicated at 35 and also taking the form of a circular plate or spider, the latter terminating in an internal periphery forming an internal gear 35. Obviously, rotation of toroid 7 by means of the mechanism herein described results in like rotation of internal gear 35. Power from the latter is transmitted through a usual type of planetary gear train, here but generally indicated as including, in part, the pinion 36 and a pinion integral therewith, pinion 37. The latter engages another gear 40 which, by a suitable clutch, not shown, is placed in driving relationship with the output shaft 42. The output shaft is journaled in the usual antifriction bearings as indicated at 43.

The structure having to do with supply of oil to the various moving parts of the instant combination, although not pertinent to this invention, involves an oil pump, only generally indicated at 44, and shown as receiving an oil supply through the line 45. In the various figures it will be seen that oil is supplied to the several rollers at their contacting surfaces by means of a network of oil lines 46. The latter feed into the hollow pivots 71 and 72 and from there are directed by the spouts 48 to a point immediately adjacent the contact point between roller and toroid.

Power is transmitted from one toroid to the other through three equally spaced rollers, here indicated at 50, 51 and 52. Each of these rollers, as well as the supports and controls for the same, is fabricated in precisely the same manner, hence a description of one is intended to be descriptive of all three. Because one of these rollers, roller 50, is shown in cross-section and in more detail in Figures 1, 2 and 3, the explanation of the operation of all three roller devices will be confined, in large part, to that roller.

Figure 2:
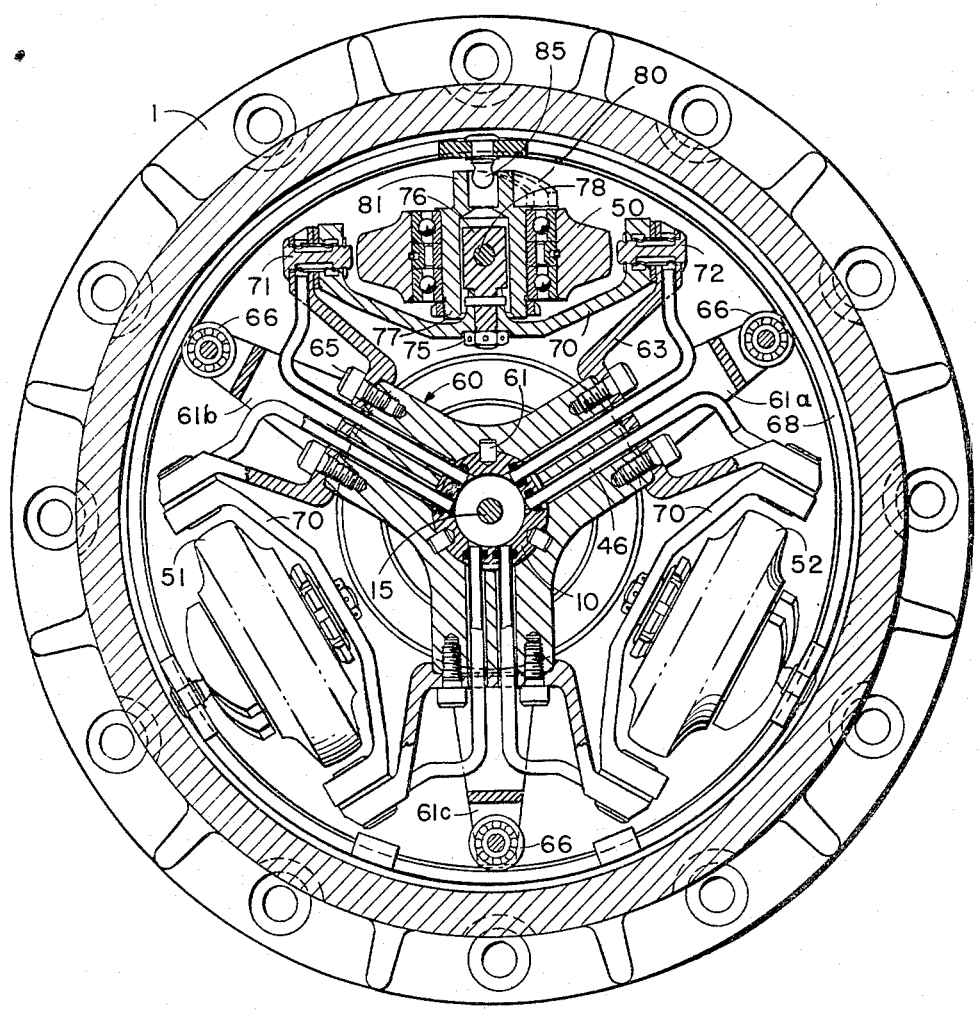
Figure 2 is a section taken on the line 2—2 of Figure 1.

The roll shown in Figure 1 indicates that a 1:1 ratio exists between the input toroid and output toroid. This is because of the midpoint position of this roller, i.e., the contact of the periphery of the rolls with the opposed toroidal surfaces is the same distance from the center of rotation of the input toroid disk 5 as it is from the rotation center of the output toroid disk 7. In any event, in order to accomplish a different drive ratio, the rolls are adapted to be tilted in the plane of the line joining the points of contact. For instance, a steering of the roll from line A—A to line B—B (see Figure 3) is in a clockwise direction; the lefthand edge of the roller will thus be moved upward and the right hand edge thereof downward. Thus, the roll 50 changes its plane of rotary movement from the plane indicated by line A—A to the plane indicated by the line B—B. This is, as stated, but a "steering" action, accomplished as a turning movement about an axis which lies normal to, or at right angles to the plane of rotation of the toroids. Directional steering in this manner is promptly followed by a "tilt" of the roller due to the consequent tracking thereof along the curved toroidal grooves. The tilting here spoken of, as distinguished from steering, is angular to a plane perpendicular to the opposed faces of the two toroids.

The foregoing is illustrated diagrammatically in Figure 1 where the line M—M bisects the roller 50 when such roller is in its normal position or position of 1:1 ratio. The angle of tilt just referred to is here shown as the angle between line M—M and the line O—O, the final position of angularity. It is now seen that when the roller has tracked to the position O—O the same is in contact with a larger diameter on the input toroid and with a smaller diameter of the output toroid. The result is to drive the output at greater speed than the input, and hence the described arrangement permits an infinite and continuous number of ratio changes.

It is thus the means of accomplishing the stated tilt of the roller that is primarily the subject of the invention herein disclosed, inasmuch as the type of toroidal transmission generally referred to herein is old in the art. The mechanism and means herein disclosed provides an improved means to change the tilt angle of the rolls by simultaneous control over the steering of the rollers. Such a functional result is obtained with a minimum of effort while at the same time assuring that these rolls will track together in order to equally share the load and drive evenly.

The main support for the several rolls is found in a triangular structural element, generally indicated at 60, and having three legs or arms 61a, 61b, and 61c, circumferentially spaced with respect to each other in 120° arcs. The support element 60 is affixed as by the pins 61 to the stationary shaft 10; hence the support element 60 is likewise stationary with respect to the rollers 50, 51 and 52 as well as with respect to the two toroids which are mounted for rotation in parallel planes on each side of the same.

Each arm of the element 60 is provided with a U-shaped cantilever spring construction 63 and each of these are suitably secured to the triangular element 60 by means of bolts 65 or any other usual media. The arms of the cantilever elements 63 which are adjacent to the respective rollers or wheels provide support for the same. They also permit deviation to correct for unbalance or overload of an individual roller during operation of the unit. Such cantilever elements 63 are pivotally interconnected with a roller supporting yoke 70 through pivot pins 71 and 72. Such pins have axes disposed at right angles, or normal, to the axis of rotation of the individual roller. The pins 71 and 72 thus permit the roller assembly to turn about an axis of "tilt" or an axis which is at right angles to the "steering" axis.

The yoke 70 constitutes the mount for a cam axle 76 which is adapted to fit within the cam support 77, the latter being bored to receive the said cam axle 76 in such fashion that there is appreciable clearance between the latter and the bore in the cam support 77, as indicated in Figure 3. The referred to clearance permits limited but adequate deviation in the manner described herein. The cam axle is secured to the yoke by a nut bolt arrangement 75.

Each of the arms 61a, 61b and 61c is fitted with a roller means 66, so positioned at the extremity thereof as to engage a peripheral control ring 68. The latter is provided with a narrow flange on its inner periphery so as to engage a complementary groove in each of the rollers 66, and the control ring 68 is thus rotatably carried by the elements 66 in such manner as will enable it to be easily rotated in either a clockwise or counterclockwise direction for simultaneous control of the individual rollers 50, 51 and 52. The mechanism for moving this control ring 68 is not detailed herein but may take the form of an automatic or manual control to move the ring as desired, thereby to control the ratio of the transmission.

The cam axle 76, rigidly connected to the yoke 70, as heretofore described, is provided with a king pin 78, this pin having its axis normal to or at right angles to the plane of rotation of the two toroids.

From the foregoing it will be seen that the pivot pins 71 and 72 permit rotation of the roller assembly in a tilt plane which is angularly disposed to the plane of axis 78 in its normal position or position of equilibrium whereas the said pin 78 permits angular deviation of the wheel assembly in planes normal to the plane of rotation of the two opposed toroids.

As indicated in the foregoing, operation to obtain change in speed ratio, in this invention, is directly dependent upon two sequential functions resulting from this construction; firstly, a steering of the individual rollers about the pivot 78 and, secondly, resultant tilting of these rollers about the axes 71 and 72 as they individually track resultant upon the initial steering action.

Figure 4:
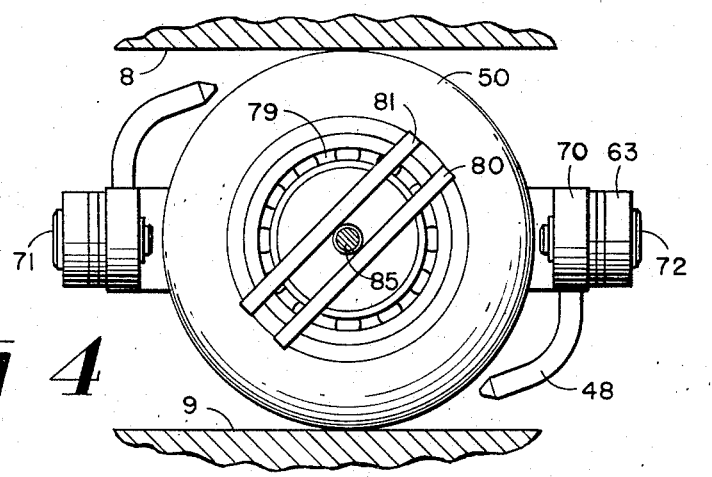
Figure 4 is a top view of the assembly shown in Figure 3, showing the cam-slot arrangement for control of the steering and tilting of the roller.
Figure 5:
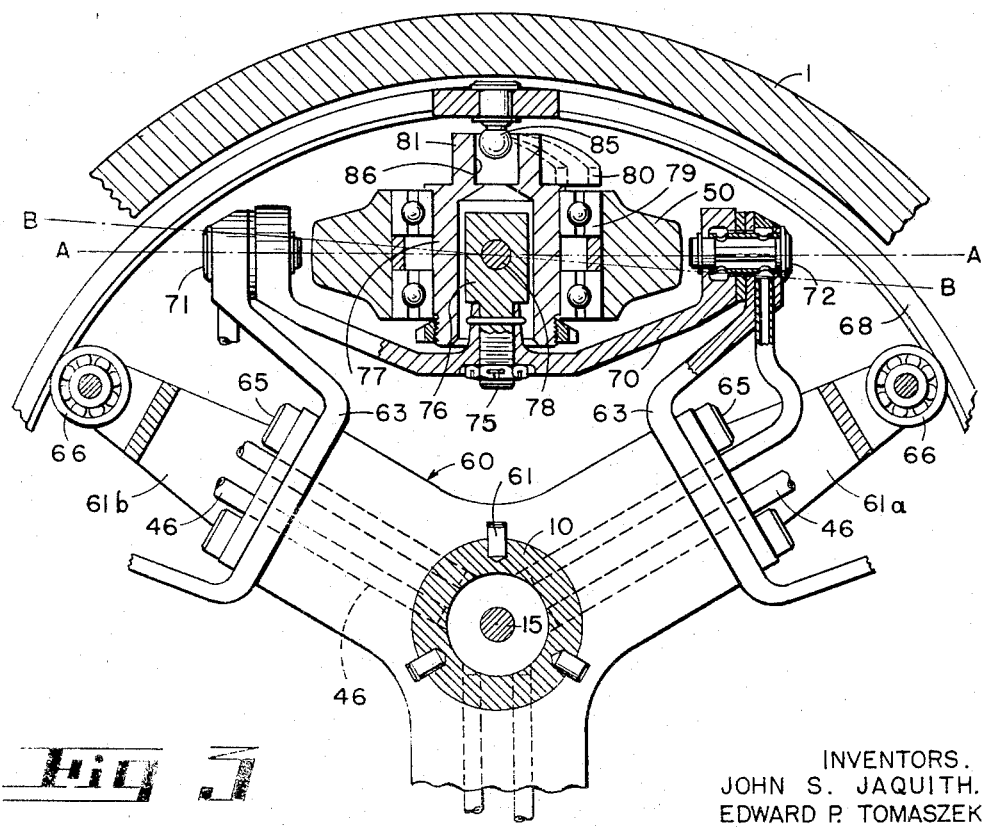

The initial steering action which has just been referred to is obtained through a cam-slot interconnection. It will be seen (Figure 3) that the cam support 77 also comprises the support for the individual wheels as indicated in Figure 3, each of which is journaled thereon and provided with anti-friction bearings 79 of a known type. Also, the cam support, as its name indicates, is provided with a cam in the form of two parallel flanges 80 and 81 which, viewing each wheel in elevation (as in Figure 4) are mounted at an angle to the vertical, here shown in the illustrated mechanism as 45°. The two elements 80 and 81 thus form a slot 86 for the reception of buttons 85, so spaced on the control ring as to ride within each of the several cam slots 86.

Accordingly, it is apparent (viewing Figure 3) that if the control ring is rotated to the right or in a clockwise direction, pressure is brought to bear upon one side of the cam, and hence the wheel, so as to "steer" the wheel from the position A—A to the position B—B. Thus, when the ring is rotated a few degrees, the rolls are first rotated about the king pin 78 to give steering action to them, such being comparable to the steering action of the front wheels of an automobile. And when the control ring 68 is rotated in the same direction as a given toroid, the contact point of the roll surface on that toroid is steered radially outward to cause that surface to move outward on the toroid. Conversely, if the control ring 68 is rotated in a direction opposite to the direction of rotation of a toroid, the contact point on that toroid is steered radially inward. In either event, the result of the initial steering action is to cause, by climbing and traction of the individual wheels, almost simultaneous "tilt" or variation in angularity of the individual rolls about the pivot pins or axes 71 and 72.

It is characteristic of the drive from the input to the output through the rotating rolls that the input toroid necessarily rotates in a direction opposite to that of the output toroid and therefore, for motion of the control ring 68 in one direction, the contact point on one toroid is steered outward and the contact point on the other toroid is steered inward. Hence, the roll 50, for example, is steered in a direction to change its position and, as a consequence, the speed ratio.

In order that the rolls 50, 51 and 52 seek positions proportional to that of the movement of the ring 68, the slots 86, in the cam supports 77 are at such an angle (as explained supra) that as the rolls move toward their new position the amount of steering action for lateral movement in the roll 15 (as seen in Figure 3) starts to decrease once the movement of control ring 68 is stoppped. At the final position of the rolls (Figure 3) the tilt about the axis of the king pin 78 is again zero. Thus, it appears that by rotary movement of the control ring 68 in one direction the speed ratio will be increased and in the opposite direction the speed ratio will be decreased, such movement being in proportion to the angular movement of the control ring.

To make sure that the rolls 50, 51 and 52 share power equally, the yokes 70 are supported by the described cantilever springs. The force of reaction on these cantilever springs is proportional to the total tractive effort at the roll contact points on the toroids. In other words, the cantilever springs 63 bend a distance proportional to the force on that particular roll. When such a spring bends, the particular roll supported by that cantilever is displaced with respect to its respective cam button 85, thereby causing cam displacement to take place with the same type of described steering action about the king pin 78. This steering action then effectively shifts or tilts the position of the involved roll in a direction that decreases or increases its effective drive.

It is thus to be seen that if one roll be in a slightly different ratio position than the other two and thereby tends to drive the toroid faster than the other two rolls, that particular roll would tend to shift more than the others, exert more bending effect upon the cantilever support than the others, and thus would get more cam action. As a result, this same roll will be shifted more to decrease the speed than the other two. In this manner the roll positions tend to equalize, especially at high tractive effort conditions. The result is an equalization of power between the several rolls 50, 51 and 52.

In the foregoing is presented a novel and efficient means and method for control of the angle of tilt of the rollers in a toroidal variable ratio transmission. Because advantage is taken of the inherent ability of such rolls to track or climb, once impetus is given to vary the angle of steering, the mechanism employed represents the essence of simplicity. Although it is obvious that this invention may be varied in many ways and other expedients and alternates employed to accomplish the purposes hereof, it is to be understood that the same is limited only by the scope of the following claims.

We claim:

1. In a toroidal type variable ratio transmission assembly having rotatable and opposed toroidal friction disks with toroidal grooves therein, a plurality of friction roller carriers between said disks having rollers in frictional engagement with said grooves, said rollers having axes positioned parallel to the plane of rotation of said disks at the condition of 1:1 speed ratio means to steer axes to right and left while in said plane, said means comprising a cam in interconnection with said carriers, a control ring to actuate said cam, a cantilever support for said carriers, said support comprising a spring means on each side of each of said carriers, whereby, upon pressure of said rollers being transmitted to said support, said spring means bend to displace said roll with respect to said cam to tilt said roll, and means to permit said tilting of said carriers in a plane angularly inclined to said parallel plane, whereby upon steering of said carriers, said rollers shift to rotate in said angularly inclined plane and thereby alter the speed ratio between the disks.

2. In a toroidal transmission assembly having opposed friction disks with toroidal grooves therein, a carrier having a roller support shaft, a toroidal disk contacting roller on said shaft, said shaft lying in a plane parallel to the plane of said disks at the condition of 1:1 speed ratio, a pivot element within said shaft mounted in a direction normal to said shaft, said pivot element permitting angular steering movement of said roller, supporting means for said carrier to exert cam action upon application of roll pressure thereto comprising a cantilever spring, a yoke, a pivot interconnecting said yoke and said cantilever, the axis of said pivot being disposed in said parallel plane to permit movement of said carrier and said roller in a direction angularly to said parallel plane, and means to steer said carrier on said pivot element comprising a control ring, a button on said ring, a cam-engaging slot on said carrier, said button being mounted to ride on said slot, said ring being arranged for rotational movement, whereby upon movement of said ring in a clockwise and counter-clockwise direction said carrier is steered by pivotal movement on said pivot element, thereby causing said roller to angularly shift upon said pivot to vary the speed ratio between the friction disks.

3. In a toroidal transmission assembly having opposed friction disks disposed in parallel planes and with toroidal grooves therein, a carrier having a roller support shaft, a toroidal disk contacting roller on said shaft, said shaft being in a plane parallel to the plane of said disks for condition of 1:1 speed ratio, a pivot element engaging said shaft and mounted in a direction at right angles to said shaft, said pivot element permitting angular steering movement of said roller in said parallel plane, a cantilever supporting means for said carrier, said supporting means comprising a spring means on each side of said carrier, said spring means being adapted to react to pressure upon said roller, a pivot on said carrier being disposed with its axis in a direction in said parallel plane normal to said pivot element axis, thereby to permit movement of said carrier and said roll in a direction angularly to said parallel plane, and means to steer said carrier on said pivot element comprising a control ring, a button on said ring, a slot on said carrier, said button being mounted to ride on said slot, said ring being arranged for rotational movement, whereby upon movement of said ring in a clockwise or counterclockwise direction, and upon application of pressure to said spring means by said roller, said carrier is steered by a pivotal movement on said pivot means, thereby causing said roller to angularly shift upon said pivot to vary the speed ratio between the friction disks.

4. In a toroidal type variable ratio transmission assembly having rotatable and opposed toroidal friction disks with toroidal grooves therein, a plurality of friction roller carriers between said disks having rollers in frictional engagement with said grooves, said rollers having axes positioned parallel to the plane of rotation of said disks at the condition of 1:1 speed ratio, means to steer axes to right and left while in said plane, said means comprising a cam in interconnection with said carriers, a control ring to actuate said cam, a cantilever support for said carriers, said support comprising resilient supports on each side of each of said carriers, whereby upon exertion of unequal pressure upon any one of said rollers being transmitted to said support said resilient support bends sufficiently to displace said one roller with respect to said control ring to cause said cam to tilt said roller to equalize drive with said other rollers, and means to permit said tilting of said carriers in a plane angularly inclined to said parallel plane, whereby upon steering of said carriers, said rollers shift to rotate in said angularly inclined plane and thereby alter the speed ratio between the disks.

5. In a toroidal transmission assembly having opposed friction disks with toroidal grooves therein, a carrier having a roller support shaft, a toroidal disk contacting roller on said shaft, said roller being subject to pressure of said opposed disks said shaft lying in a plane parallel to the plane of said disks at the condition of 1:1 speed ratio, a pivot element within said shaft mounted in a direction normal to said shaft, said pivot element permitting angular steering movement of said roller, a resilient supporting means for said carrier, said resilient supporting means exerting cam action upon application of unequal roll pressure thereto by said disks, a yoke, a pivot interconnecting said yoke and said resilient supporting means, the axis of said pivot being disposed in said parallel plane to permit movement of said carrier and said roller in a direction angularly to said parallel plane, and means to steer said carrier on said pivot element comprising a control ring, a button on said ring, a cam-engaging slot on said carrier, said button being mounted to ride on said slot, said ring being arranged for rotational movement, whereby upon movement of said ring in a clockwise and counterclockwise direction said carrier is steered by pivotal movement on said pivot element, thereby causing said roller to angularly shift upon said pivot to vary the speed ratio between the friction disks.

6. In a toroidal transmission assembly having opposed friction disks disposed in parallel planes and with toroidal grooves therein, a carrier having a roller support shaft, a toroidal disk contacting roller on said shaft, said shaft being in a plane parallel to the plane of said disks for condition of 1:1 speed ratio, a pivot element engaging said shaft and mounted in a direction at right angles to said shaft, said pivot element permitting angular steering movement of said roller in said parallel plane, a cantilever supporting means for said carrier, said supporting means comprising a resilient means on each side of said carrier, said resilient means being adapted to react to pressure upon said roller, a pivot on said carrier being disposed with its axis in a direction in said parallel plane normal to said pivot element axis, thereby to permit movement of said carrier and said roller in a direction angularly to said parallel plane, and means to steer said carrier on said pivot element comprising a control ring, a button on said ring, a slot on said carrier, said button being mounted to ride on said slot, said ring being arranged for rotational movement, whereby upon movement of said ring in a clockwise or counterclockwise direction, and upon application of pressure to said resilient means by said roller, said carrier is steered by a pivotal movement on said pivot means, thereby causing said roller to angularly shift upon said pivot to vary the speed ratio between the friction disks.

References Cited in the file of this patent

UNITED STATES PATENTS

| 1,947,044 | Gove | Feb. 13, 1944 |
| 2,856,784 | Weisel | Oct. 21, 1958 |

FOREIGN PATENTS

| 1,007,590 | Germany | May 2, 1957 |